United States Patent [19]

Boimond

[11] Patent Number: 4,719,420
[45] Date of Patent: Jan. 12, 1988

[54] APPARATUS FOR MEASURING THE POSITION OF A MOVING MEMBER RELATIVE TO A FIXED MEMBER

[75] Inventor: Guy Boimond, Puyricard, France

[73] Assignee: Commissariat a l'Energie Atomique, Paris, France

[21] Appl. No.: 564,759

[22] Filed: Dec. 23, 1983

[30] Foreign Application Priority Data

Dec. 23, 1982 [FR] France ............... 82 21666

[51] Int. Cl.$^4$ ............... G01B 7/14; G21C 17/00; G01R 33/12; G01N 27/72
[52] U.S. Cl. ............... 324/208; 324/243; 376/258
[58] Field of Search ............... 324/207, 208, 235, 243; 178/18-20; 382/3; 376/258; 340/870.02, 870.27

[56] References Cited

U.S. PATENT DOCUMENTS

| 3,598,903 | 8/1971 | Johnson et al. | 178/18 |
| 3,662,257 | 5/1972 | Fujiwara | 324/207 |
| 3,906,469 | 9/1975 | Kronk | 324/208 |
| 4,064,451 | 12/1977 | Foxworthy | 376/258 |

FOREIGN PATENT DOCUMENTS

| 1213310 | 3/1966 | Fed. Rep. of Germany . |
| 1500121 | 9/1967 | France . |
| 2350578 | 12/1977 | France . |
| 2364432 | 4/1978 | France . |
| 373987 | 1/1964 | Switzerland . |
| 2078375 | 1/1982 | United Kingdom . |

OTHER PUBLICATIONS

Suzuki et al., "Electromagnetically Coupled Data Tablet", The Transactions of the IECE of Japan, vol. E61, No. 4, 4/1978, pp. 307-308.

Primary Examiner—Reinhard J. Eisenzopf
Assistant Examiner—Walter E. Snow
Attorney, Agent, or Firm—Oblon, Fisher, Spivak, McClelland & Maier

[57] ABSTRACT

The invention relates to an apparatus making it possible to measure the position of a moving bar in a non-magnetic guidance enclosure. The bar carries a permanent magnet, whose position is detected by at least one group of magnetometer transducers, arranged along a generatrix of the enclosure. The transducers of the same group are connected so as to form a matrix of n rows and p columns. The exciting windings of the transducers of the same row are connected in series and each row is supplied in turn by a multiplexing circuit. In the same way, the reading windings of the transducers of the same column are connected in parallel and each column is scanned in turn by a multiplexing circuit.

13 Claims, 12 Drawing Figures

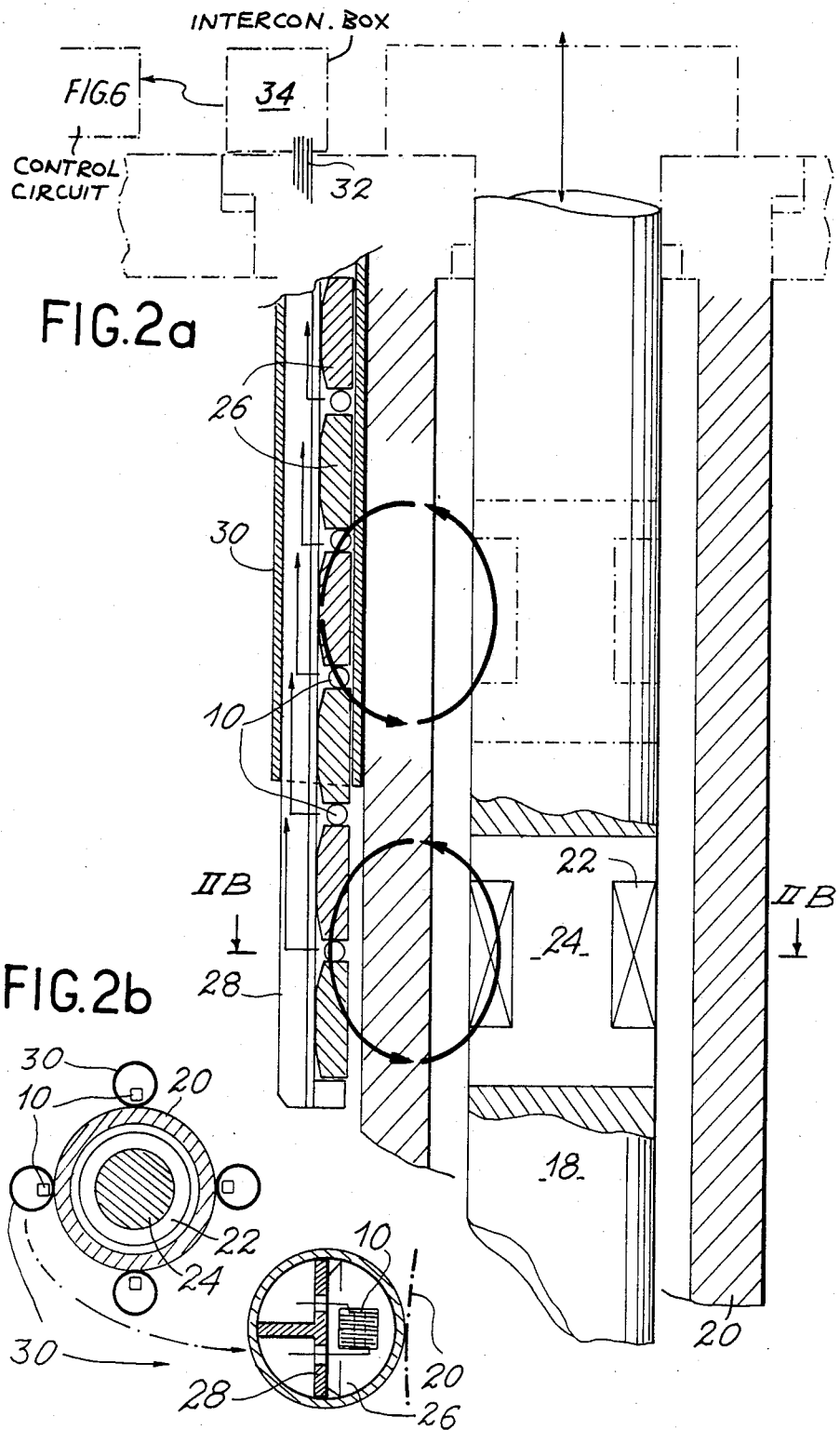

APPARATUS FOR MEASURING THE POSITION OF A MOVING MEMBER RELATIVE TO A FIXED MEMBER

BACKGROUND OF THE INVENTION

1. Field of the Invention

The present invention relates to an apparatus making it possible to measure the position of a moving member, such as a bar, relative to a fixed member, such as a cylindrical enclosure in which the said bar moves.

Such an apparatus is more particularly used in the measurement of the position of absorbing control rods, which make it possible to check the reactivity in the core of nuclear reactors of any random type (pressurized water, boiling water or fast neutron). However, the present invention is not limited to this application and can be used in all cases where it is necessary to accurately know the position of a member moving in a given direction, even in a hostile environment and without the overall dimensions of the apparatus becoming excessive.

2. Description of the Prior Art

In the present state of the art, the detection of the displacement of control rods in the core of 900 MW pressurized water reactors is carried out by means of a differential transformer. However, this detector type has an inadequate resolution (1/30 of the total travel of the rods, i.e. 123 mm for a travel of 3700 mm). Moreover, there can be no more than one detector per mechanism.

These limitations, which were not fundamentally disturbing for such a reactor type, become highly prejudicial in the case of certain nuclear reactor projects, in which the optimization of the operating conditions lead to a very accurate check of the position of the absorbing rods in the core and confers on this measurement safety conditions implying redundant measures on each of the inspection mechanisms.

SUMMARY OF THE INVENTION

Accordingly, it is an object of the present invention to provide an apparatus permitting the accurate measurement of a position, if necessary permitting a redundant measurement and making it possible to carry out an absolute measurement of the position, i.e. not having to call on an earlier state of the apparatus.

The present invention therefore specifically relates to an apparatus for measuring the position of a moving member in a given direction relative to a fixed member, incorporating a magnetic flux generating mark carried by the moving member and at least one group of transducers changing state under the effect of said magnetic flux, the transducers being positioned at regular intervals on the fixed member in the indicated direction, in such a way that at least one transducer changes state under the effect of the magnetic flux, wherein the transducers of the same group are electrically grouped according to a matrix of n rows and p columns, whose n rows are supplied in turn by supply means and whose p columns are processed in turn by reading means.

According to a preferred embodiment of the invention, the supply means comprise n transformers each having a primary winding which can be connected to an alternating current supply and a secondary winding connected in series with the transducers of the same row.

Preferably, each of the n transformers also comprises a control winding, the n transformers being electrically grouped in accordance with a matrix of a rows and b columns and the primary windings and control windings are respectively connected in series row by row and column by column and can be respectively connected to the alternating power supply and to a direct saturation current source.

In this case, the supply means can also comprise a supply lines, each of these supply lines being connected to a row of primary windings Ep across a capacitor and to a row of control windings Ec across a diode.

In this preferred embodiment of the invention, the reading means comprise p/2 transducers, each having at least two primary windings in phase opposition and respectively connected to two non-consecutive transducers of the same row, and a secondary winding which can be connected to a measuring circuit.

Preferably, each of the p/2 transformers also comprises a control winding, the p/2 transformers being electrically grouped in accordance with a matrix of k rows and l columns, the secondary windings of the same row being connected in series and being connectable to a measuring circuit, and the control windings of the same column are connected in series and can be connected to a direct saturation current source.

In this case, the reading means can also comprise k measuring rows, each of the measuring rows being connected to a row of secondary windings across a capacitor and to a column of control windings across a diode.

According to a first constructional variant of the invention, the magnetic transducers are magnetometer transducers incorporating a magnetic core with a rectangular hysteresis loop and two windings wound onto said core and respectively constituting the excitation and reading elements, the excitation elements of the transducers of the same row being connected in series and the reading elements of the transducers of the same column being connected in parallel.

In this case, the magnetometer transducers are preferably fixed to a non-magnetic support and are separated by magnetic shunts with the transducers, the support and the shunts being located in a non-magnetic tube arranged on the other side of the fixed member with respect to the moving member.

According to a second constructional variant of the invention, the transducers are reed switches with the switches of the same row being connected in series, each of the p/2 transformers incorporating two n primary windings, each switch of two non-consecutive columns being connected in parallel on a different primary winding of one of the p/2 transformers, in such a way that the primary windings connected to two switches of the same row are in phase opposition.

In this case, the reed switches are electrically connected by conductors made from a magnetic material and are fixed to a support by means of electrically insulating connectors with the switches, the conductors, the support and the connectors being positioned in a non-magnetic tube located at the other side of the fixed member relative to the moving member.

According to another aspect of the ivention, several groups of transducers are arranged on the fixed member around the moving member, the transducers of each group being positioned at the same level, so as to give a redundant measurement of the position of the bar.

According to yet another aspect of the invention, the moving member moves in accordance with a given incremental step and the distance between two consecutive magnetometer transducers of the same row is equal to twice the step.

BRIEF DESCRIPTION OF THE DRAWINGS

The invention is described in greater detail hereinafter relative to two non-limitative embodiments and with reference to the attached drawings, wherein:

FIG. 2a shows a longitudinal sectional view of a control bar for the absorbing rod and its guidance jacket illustrating the installation according to a first constructional variant of the invention of an apparatus for measuring the position of the bar having several magnetometer transducers, and FIG. 2b a cross-sectional view along line IIb of FIG. 2a;

DETAILED DESCRIPTION OF THE PREFERRED EMBODIMENTS

Figure 1A:
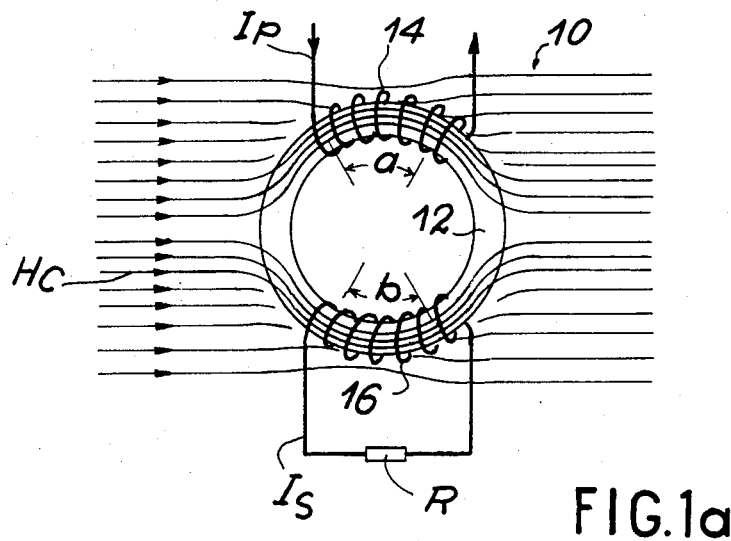
FIG. 1a shows a magnetometer transducer placed in a uniform magnetic field HC and FIG. 1b a curve illustrating the variations of the peak current Is supplied by the transducer as a function of the field HC.
Figure 1B:
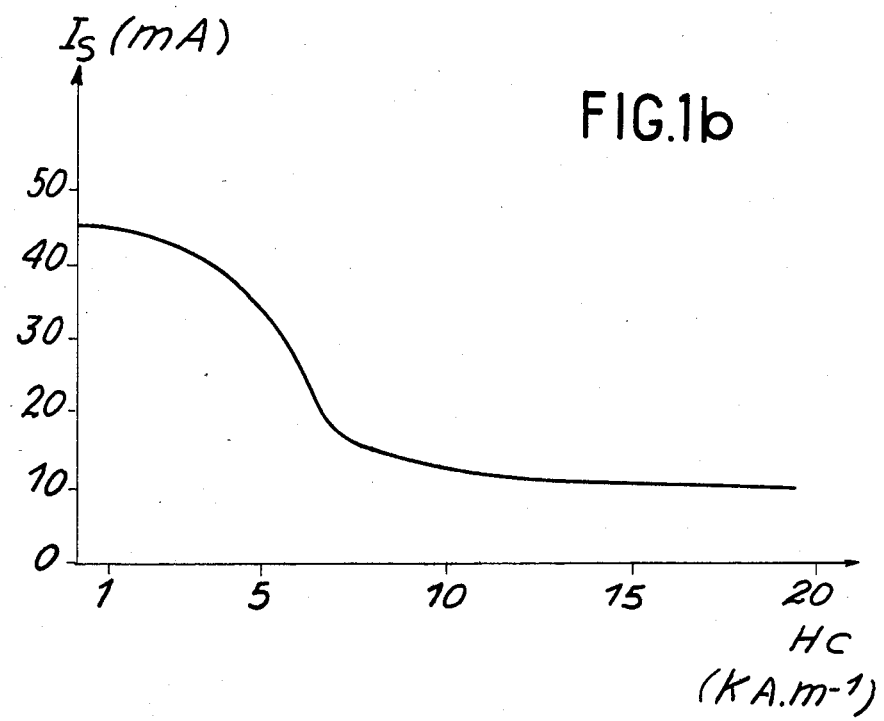

In order to facilitate the understanding of the first constructional variant described, which preferably uses magnetometer transducers, reference will firstly be made to the operating principle of such transducers with reference to FIGS. 1a and 1b. However, for greater detail, reference can be made to French Patent application No. 7,813,483 of May 8, 1978, filed in the name of the Commissariat à l'Energie Atomique and which relates to a magnetic field detector. It should also be noted that other transducer types, such as Hall probes, can be used in place of the magnetometers, without passing beyond the scope of the invention.

FIG. 1a shows a magnetometer transducer 10 in the form of a toroidal magnetic circuit 12, which is provided by means of a magnetic material tape having a rectangular hysteresis loop. In this particular embodiment, this circuit 12 constitutes the core of a current transformer having a primary excitation winding 14 and a secondary reading winding 16 are wound onto the core.

Consideration will now be given to this core placed in a uniform magnetic field HC perpendicular to the axis of the core. This field leads to a flux circulation in the core in the same direction as the field and a maximum induction in the sectors of the core marked a and b in FIG. 1.

If an alternating current Ip is injected into the primary winding 14, the latter circulates a flux, which is added at all times to that produced by the field HC in one of the sectors a or b and is subtracted in the other. No matter what the alternation or half-cycle of field $H_A$ produced by winding 14, there is always at least one sector of the core in which the two fields $H_A$ and HC are added to one another.

In this sector, the useful induction variation is equal to:

$$\Delta B = B_S - (\mu_o \cdot \mu_r H_C)$$

with $B_S$ = induction at saturation of the magnetic material
$\mu_o$ = permeability of the air $(4\pi 10^{-7})$
$\mu_r$ = permeability of the magnetic material
$H_C$ = external steady field.

When $H_C = B_S/(\mu_o \cdot \mu_r)$, the magnetic material is saturated and $\mu_r$ is very close to 1, in such a way that the induction variation caused by $H_A$ becomes very small because it is limited by the permeability of the air $\mu_o$.

If consideration is now given to the complete core, everything takes place as if it was interrupted by the air gap corresponding to the saturated sector and, if the leakage flux in the air is ignored, the induction variations prevailing there are equal to those existing in this sector.

The curve of FIG. 1b gives the amplitude of the secondary peak current $I_S$, as a function of the external field $H_C$ with the primary current being kept constant at 100 mA peak 10 KHz. Thus, as a result of this curve, it is apparent that magnetometer 10 can be advantageously used as a transducer for detecting the presence of a uniform magnetic field $H_C$, by measuring the secondary current $I_S$.

Magnetometer transducers offer numerous advantages, particularly for the application to the detection of the displacement of bars carrying control rods in nuclear reactors. Particular reference is made to the following advantages:

Reduced overall dimensions (e.g. external diameter 5.3 mm, for a height of approximately 2 mm);

A good thermal behaviour up to 350° C., if the winding wire is appropriately insulated;

A sensitivity to the absolute value of the magnetic field and not to its derivative; and An almost complete insensitivity to the field oriented parallel to the axis of the core (this provides an interesting directional effect for certain applications).

FIGS. 2a and 2b show the use of such magnetometer transducers in measuring the position of a bar 18 in a non-magnetic enclosure 20.

The basic principle of the invention consists of providing the bar 18 with a magnetic index or mark, constituted by an annular permanent magnet 22, whose position is detected by magnetometers 10 located on a generatrix of the cylindrical enclosure 20. More specifically, annular magnet 22 is mounted on an intercalated support 24, which is itself fixed to bar 18.

In the case where the control bar generates the magnetic flux (by using control coils and a ferromagnetic steel bar), the permanent magnet is not absolutely necessary.

In order to carry out measurements of an absolute nature and more specifically not having to call on a previous state of the system, the magnetometers 10 are arranged in such a way that at all points of the useful travel of bar 18, there is always at least one magnetometer excited by the magnetic mark 22, which implies, as is shown by the broken lines in FIG. 2a, that two adjacent transducers can be simultaneously excited by the magnet. Obviously, the dimensions of the magnet must be appropriately adapted (having a length close to the gap separating two consecutive transducers). Moreover, in order to ensure the continuity of the flux between two adjacent transducers, the gap separating the transducers is magnetically shunted by mild steel parts 26.

When the application is used for the measurement of the displacement of bars carrying absorbing rods in a nuclear reactor, the bars 18 move in accordance with a given incremental step. The gap between two magnetometers 10 can then be defined in such a way as to obtain a resolution of the measurement equal to this incremental step characterizing the displacement of the control bar of an absorbing rod. The possibility of simultaneously exciting two consecutive magnetometer transducers is used for detecting the intermediate position between these two transducers, which can consequently be spaced by two steps. The incremental step characterizing the displacement of the bar is, for example, 16 mm and the total travel of an absorbing rod is, for example, 259 steps, so that the distance between two consecutive magnetometers is then 32 mm and each row of transducers arranged along a generatrix of the cylindrical enclosure 20 consists of 128 magnetometer transducers.

The application to nuclear reactors implies particularly stringent safety rules. Therefore, it is then desirable to carry out redundant measurements, for example four, as is shown in FIG. 2b, of the position of the moving bar 18 in fixed enclosure 20. More specifically, there are then four rows of transducers 10 along four generatrixes of enclosure 20 displaced by 90° from one another with the transducers of the different rows being positioned at the same levels along the enclosure, so as to ensure the redundancy of the measurement.

As is illustrated in FIGS. 2a and 2b, the magnetometer transducers 10 of the same row and the magnetic shunts 26 associated therewith are fixed to a non-magnetic support 28 having, for example, a T-shaped profile, and the assembly is introduced into a non-magnetic guide tube 30, e.g. made from stainless steel and which is positioned outside enclosure 20, parallel to a generatrix thereof. Bearing in mind the dimensions of transducers 10, given in an exemplified manner hereinafter, the diameter of the guide tube is e.g. approximately 20 mm.

The magnetometer transducers 10 are wired by means of wires 32 passing within tubes 30 with all the ends being brought into an interconnection box 34, positioned at the upper end of the guide tubes. The connections relative to the secondary winding 16 of the magnetometer transducers are organized in such a way that the load impedance R (cf FIG. 1) is identical, no matter what the position of the transducer in the detector. The same procedure is applied to the primary windings 14, but by groups of p transducers, as will become subsequently apparent with reference to FIG. 3. For this purpose, one of the ends of the primary winding passes to interconnection box 34 by the most direct route, in such a way that the primary windings 14 of the same group of p transducers 10 are connected in series, whereas the other end of the primary winding passes via the low end of the cylindrical enclosure 20 before rising up in guide tube 30 to box 34.

Figure 3:
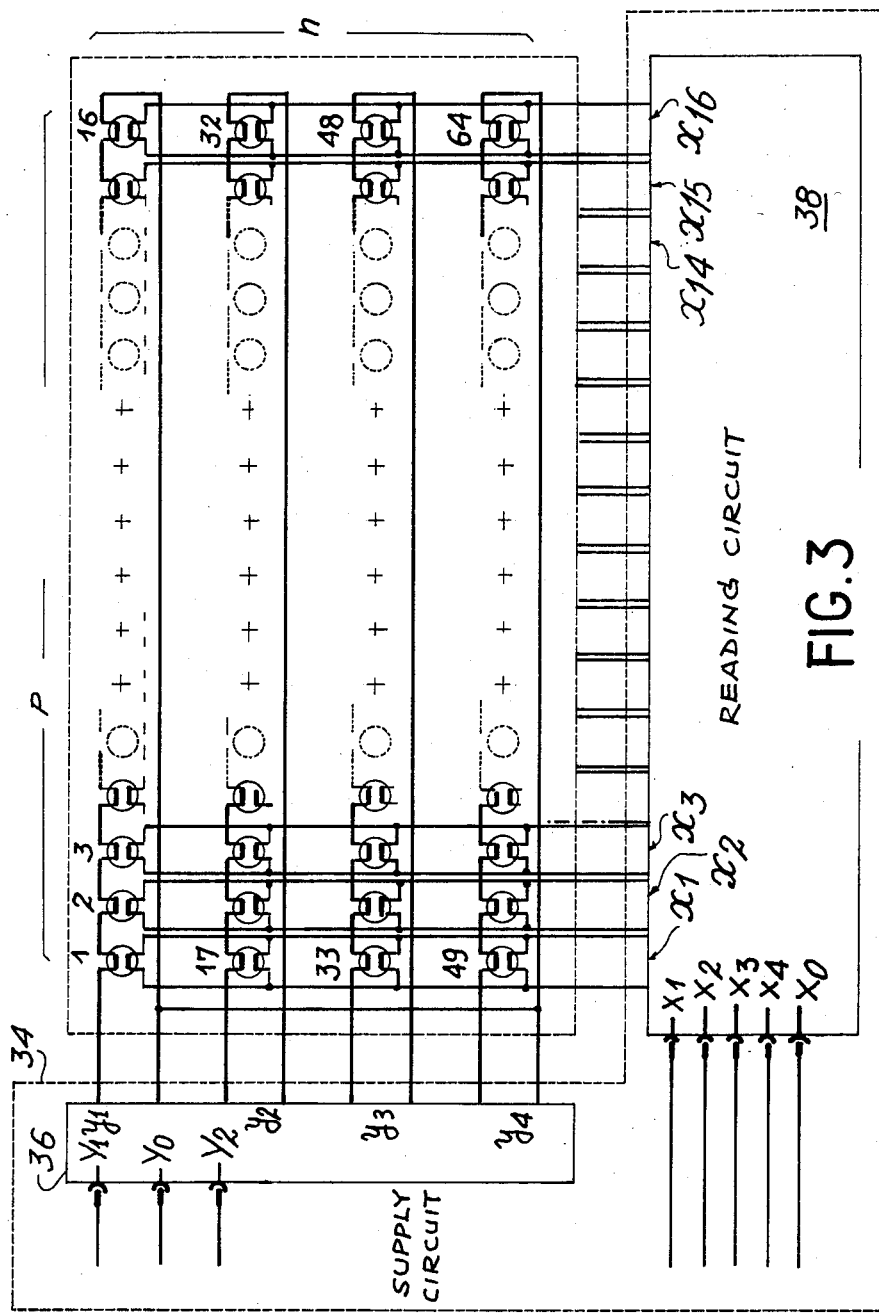
FIG. 3 is a diagram showing the electrical interconnection circuit for the magnetometer transducers of the apparatus of FIG. 2 and the excitation and reading circuits for said transducers.

The interconnection circuit of the wires 32 within box 34 is diagrammatically shown in FIG. 3. In order to facilitate understanding, this FIG. 3 shows the different connections between wires 32 level with transducers 10, whereas these connections are in reality located in an interconnection box 34, at the upper end of the guide tubes.

Obviously, an interconnection circuit like that shown in FIG. 3, is associated with each of the rows of transducers.

FIG. 3 shows the case where each group of transducers consists of 64 transducers numbered 1 to 64. However, the number of transducers of a particular group can be different from this without passing beyond the scope of the invention.

According to the invention, the interconnection circuit connects the transducers of the same row in order to define, from the electrical standpoint, a rectangular matrix of transducers with n rows and p columns, as is diagrammatically shown in FIG. 3. More specifically, the p first transducers of the row constitute the first matrix row and the following p transducers constitute the second matrix row and so on. Preferably, the number n of matrix rows is less than the number p of matrix columns, the numbers n and p obviously being chosen in such a way that the product n.p is equal to the number of transducers in the same group.

In the embodiment shown in FIG. 3, where each group consists of 64 transducers, it can be seen that the matrix of transducers consists of four matrix rows and 16 matrix columns.

As is illustrated in FIG. 3, the interconnection circuit of the transducers is such that the primary excitation windings 14 of the same row of the transducer matrix are connected in series and that the secondary reading windings 16 of the same matrix column are connected in parallel.

As a result of this interconnection of the transducers in matrix form, the excitation current $I_p$ (FIG. 1) is simultaneously injected into all the excitation windings of one row and the state of the transducers is analyzed by measuring the secondary current $I_S$ column by column. This operation is repeated by successively exciting all the rows, so as to locate the transducer or transducers excited by the presence of the magnet index or mark 22.

This marking takes account of the fact that the secondary current $I_S$ is at a minimum when the transducer is saturated by the presence of the magnetic mark and is maximum when it is not saturated.

The parallel arrangement in a column of n secondary windings 16 requires certain precautions, because the unexcited transducers of the n−1 other rows consume a magnetizing current sampled from the useful signal. To minimize this effect, the load impedance R (FIG. 1) is reduced to the minimum in order to reduce the secondary voltage and therefore the magnetizing current to be supplied to the parallel-positioned transducers 10. This is one of the reasons why a rectangular matrix has been chosen in preference to a square matrix.

In order to reduce to the maximum, the volume of the wiring connecting the interconnection box 34 to the electronic processing circuit which, in the manner shown hereinafter, can be installed outside the reactor building in the described application, it is proposed to provide multiplexing circuits within box 34. Thus, FIG. 3 shows a supply circuit 36 making it possible to successively excite the primary winding 14 of transducers 10 of each of the n rows of the matrix and a reading circuit 38 making it possible to successively scan the secondary windings 16 of the transducers of each of the p columns of the matrix.

Figure 4:
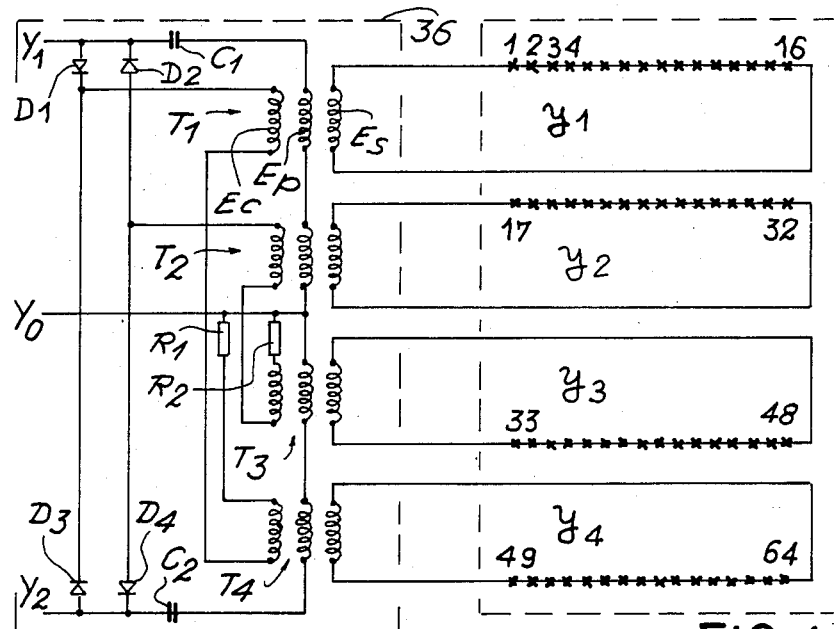
FIG. 4 is a diagram showing in greater detail the excitation circuit for the transducers.

FIG. 4 shows a preferred embodiment of the supply circuit 36. It is clear that this circuit can be replaced by any other known multiplexing circuit, without passing beyond the scope of the invention.

Circuit 36 comprises n transformers T (4 in the represented embodiment and designated by the references $T_1$ to $T_4$), a transformer being associated with each of the n rows ($y_1$ to $y_4$) of the matrix of transducers.

Each of the transducers T comprises three identical windings $E_c$, $E_p$ and $E_s$, wound onto a not shown magnetic core. These windings respectively constitute a control winding $E_c$, a primary winding $E_p$ and a secondary winding $E_s$.

The secondary winding $E_s$ of each transformer is connected in series with the excitation windings 14 of the row of transducers corresponding thereto.

The primary windings $E_p$ of the transformers are connected in series in pairs, e.g. in accordance with the order of the rows of the matrix (the primary windings of $T_1$ and $T_2$ on the one hand, and $T_3$ and $T_4$ on the other being connected in series).

Finally, the control windings $E_c$ are also connected in series in pairs, but in accordance with different groups from those of the primary windings $E_p$. For example, in the case of FIG. 4, the control windings of $T_1$ and $T_4$ on the one hand and $T_2$ and $T_3$ on the other are connected in series.

The supply circuit 36 also comprises n/2 supply lines (2 in the described embodiment and designated $y_1$ and $y_2$) in which circulate the excitation current from the processing circuit. Each of the lines $Y_1$, $Y_2$ respectively supplies the primary windings $E_p$ of transformers $T_1$ and $T_2$ across a capacitor $C_1$ and the primary windings of transformers $T_3$ and $T_4$ across a capacitor $C_2$, another line $Y_0$ making it possible to close the electric circuit.

Moreover, lines $Y_1$ and $Y_2$ supply the control windings $E_c$ of transformers $T_1$ and $T_4$ across two diodes $D_1$ and $D_3$ respectively, passing from lines $Y_1$ and $Y_2$ to line $Y_0$.

Comparably, lines $Y_1$ and $Y_2$ supply the control windings $E_c$ of transformers $T_2$ and $T_3$ across two diodes $D_2$ and $D_4$, respectively passing from line $Y_0$ to lines $Y_1$ and $Y_2$.

Finally, resistors $R_1$ and $R_2$ are placed in series respectively with the control windings $E_c$ of transformers $T_1$ and $T_4$ on the one hand and $T_2$ and $T_3$ on the other.

As a result of the supply circuit 36 described hereinbefore with reference to FIG. 4, it is clear that it is possible, as required, to switch the excitation current supplied by the processing circuit successively towards the n lines $Y_1$ to $Y_4$.

Thus, when it is wished to excite one of the lines $Y_1$ or $Y_2$, it is merely necessary to inject into $Y_1$ an alternating current, whose direct or continuous component is blocked by capacitor $C_1$ before passing through the primary windings $E_p$ of the corresponding transformers $T_1$ and $T_2$. In order to only excite one of the lines $Y_1$ or $Y_2$, the injection of current into whichever of the two lines it is not wished to excite is simultaneously prevented by short-circuiting the corresponding transformer $T_1$ or $T_2$.

To this end, the control windings $E_c$ of this transformer receives a direct current supplied from $Y_2$ to $Y_0$ across diode $D_3$, which saturates transformer $T_1$ if the current polarity is positive, or across diode $D_4$, which saturates transformer $T_2$ if it is negative. The same current also saturates one of the two transformers $T_3$, $T_4$ associated with the two other lines $Y_3$, $Y_4$, but has no action because line $Y_2$ has no alternating component in this part of the sequence.

The selection of lines $Y_3$ and $Y_4$ takes place on the basis of the same principle, but the functions of $Y_1$ and $Y_2$ are reversed, the alternating current being injected by $Y_2$ and the direct component by $Y_1$.

The following Table I defines the selection sequence of $Y_1$ to $Y_4$ by adopting the example of the case where the current intensity injected at $Y_1$ and $Y_2$ is 100 mA.

TABLE I

| Line | $Y_1$ (mA) I | $Y_1$ (mA) Icc | $Y_2$ (mA) I | $Y_2$ (mA) Icc |
|---|---|---|---|---|
| y1 | 100 | 0 | 0 | −100 |
| y2 | 100 | 0 | 0 | +100 |
| y3 | 0 | +100 | 100 | 0 |
| y4 | 0 | −100 | 100 | 0 |

Figure 5:
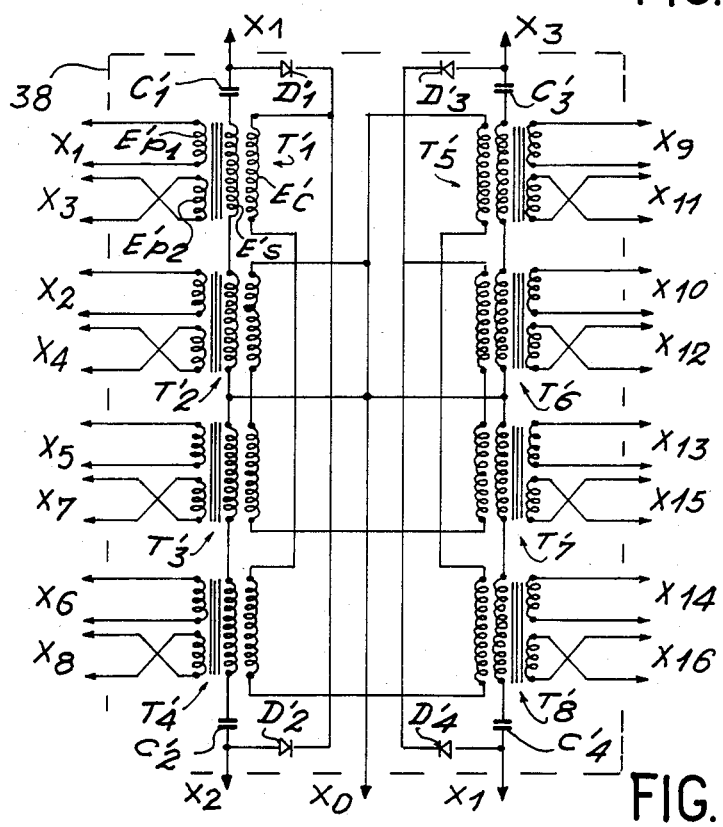
FIG. 5 is a diagram showing in greater detail the reading circuit for the transducers.

A description will now be given, with reference to FIG. 5, of an embodiment of the reading circuit 38. In the same way as circuit 36, this circuit can be replaced by any other known multiplexing circuit without passing beyond the scope of the invention.

Circuit 38 comprises p/2 transformers T' (8 in the represented embodiment and designated by the references $T'_1$ to $T'_8$), one transformer being simultaneously associated with two non-consecutive columns ($x_1$ and $x_3$; $x_2$ and $x_4$ ... $x_{14}$ and $x_{16}$) of the matrix of transducers.

Each of the transformers T' comprises two primary windings $E'_{p1}$ and $E'_{p2}$, a secondaryy winding $E'_s$ and a control winding $E'_c$, wound onto a magnetic core.

The primary windings $E'_{p1}$ and $E'_{p2}$ of the same transformer T' are connected to the parallel-connected reading windings 16 of the two columns of transducers corresponding to said transformer. This connection takes place in the reverse direction, in such a way that the current which can circulate in the primary winding $E'_{p1}$ is the reverse of that which can circulate in the winding $E'_{p2}$.

The secondary windings $E'_c$ of transformers T' are connected in series in pairs. For example, in the variant shown in FIG. 5, the secondary windings of successive transformers $T'_1$ and $T'_2$, $T'_3$ and $T'_4$, $T'_5$ and $T'_6$, $T'_7$ and $T'_8$ are connected in series.

Finally, the control windings $E'_c$ of transformers T' are connected in series to form two groups of p/4 windings $E'_c$ (i.e. four windings in the described variant), each group incorporating one winding taken in each pair of transformers, whose secondary windings $E'_s$ are connected in series. In the represented variant, the control windings $E'_c$ of transformers $T'_1$, $T'_4$, $T'_8$ and $T'_5$ on the one hand and the control windings of transformers $T'_6$, $T'_7$, $T'_3$ and $T'_2$ on the other are connected in series.

The reading circuit 38 also comprises p/4 supply and reading lines X (4 in the represented embodiment and designated by the references $X_1$ to $X_4$) and a common line $X_0$ making it possible to close the electric circuit. Each of the lines $X_1$ to $X_4$ connects circuit 38 to the processing circuit and can be alternately used for the injection of a current into the control windings $E'_c$ and to the transmission to the processing circuit of the current circulating in the secondary windings $E'_s$.

Each of the lines $X_1$ to $X_4$ is respectively connected to each pair of secondary windings $E'_s$, connected in series across a capacitor $C'_1$ to $C'_4$ used for blocking the continuous component of the signal.

Lines $X_1$ and $X_2$ on the one hand and lines $X_3$ and $X_4$ on the other are respectively connected to the groups of control windings $E'_c$ of transformers $T'_1$, $T'_4$, $T'_8$ and $T'_5$ on the one hand and $T'_6$, $T'_7$, $T'_3$ and $T'_2$ on the other, across diodes $D'_1$ to $D'_4$ passing towards the output line $X_0$.

As a result of the reading circuit 38 described with reference to FIG. 5, it is clear that it is possible to ensure the multiplexing of the signals collected at the base of the columns of the matrix of transducers.

Thus, this circuit firstly makes it possible to obtain the vector difference of the signals from two non-consecutive columns, as a result of the aforementioned arrangement of the primary windings $E'_{p1}$ and $E'_{p2}$ of each transformers $T'$. As a result of this characteristic, a signal carrying two pieces of information is obtained, namely the amplitude indicating the saturation state of a transducer in one or other of the two considered columns and the phase displacement relative to the excitation current, which makes it possible to determine to which column this transducer belongs.

Moreover, in the same way as for the supply circuit 36 described hereinbefore with reference to FIG. 4, reading circuit 38 makes it possible to reduce the number of conductors making it necessary to carry the signals supplied by transformers $T'_1$ to $T'_8$, as a result of the special connection of the secondary windings $E'_s$ and the control windings $E'_c$.

In order to illustrate the operation of the reading circuit 38 illustrating first of these principles, a description will now be given of a number of examples with reference to FIGS. 3 and 5.

Assuming that the magnetic mark 22 (FIG. 2a) is centred on magnetometer 3 with the latter being saturated, then when line $Y_1$ is excited, current $IE'_{p2}$ in winding $E'_{p2}$ of transformer $T'_1$ is consequently zero. Conversely, current $IE'_{p1}$ from magnetometer 1 is nominal. Thus, this magnetometer 1 is not saturated because the lines of force of the magnet cannot, by construction, saturate more than 3 consecutive transducers. On the secondary winding $E_s$ of transformer $T'_1$ a current $IE_s = K(IE_{p1} - IE_{p2}) = KIE_{p1}$ is then collected, because $IE_{p2}$ is zero and this signal is in phase with the excitation current $IY_1$ of line $Y_1$.

Consideration will now be given to two adjacent transducers 2 and 4. If these transducers are not saturated, they both feed into windings $E'_{p1}$ and $E'_{p2}$ of transformer $T'_2$ and, as a result of the aforementioned relationship, the current $IE_s$ of this transformer is zero. If these two transducers are saturated (this is possible because of the clearance of the control bar), the result is the same as hereinbefore, because the two primary currents of transformer $T'_2$ are zero. In these two cases, the saturation of the transducer 3 is identified without ambiguity.

The following case presupposes the magnetic mark 22 to be in an intermediate position, e.g. between transducers 3 and 4, so that the latter are then saturated. Thus, winding $E'_s$ of tranformer $T'_1$ supplies a current $-KIE_{p2}$ in phase opposition with $IY_1$ and winding $E'_s$ of transformer $T'_2$ supplies a current $KIE_{P1}$ in phase with $IY_1$. The analysis of these two signals makes it possible to identify two saturated transducers and their contiguity can be interpreted as the median position of the mark between these two transducers.

This analysis only applies within the groups of four overlapping columns x1 to x4, x5 to x8, x9 to x12, x3 to 16, because the pairwise opposition of the columns i and i+2 leads to a periodicity of 4 and to a different behaviour, at the boundaries of these groups, from that analyzed hereinbefore.

This difference only relates to a single case, namely that where three transducers are simultaneously saturated. It was shown hereinbefore in the case of transducers 2, 3 and 4, that only three was detected. If this straddling triplet is taken to be on a boundary between two groups of four, e.g. transducers 3, 4 and 5, each of the latter is not opposed to the other and each will be detected as being saturated; transducer 3 by transformer $T'1$, transducer 3 by transformer $T'2$ and transducer 5 by transformer $T'3$. This difference of behaviour is easily compensated, because the processing algorithm can easily remove this ambiguity by designating the median transducer as the probable position of the magnetic mark 22. To avoid this problem, it is, in particular, possible to use an overlap of type i+8 instead of i+2 with the periodicity then corresponding to the length of one row of the matrix of transducers.

The second principle put into effect by the reading circuit 38 makes it possible, as mentioned hereinbefore, to carry the signal supplied by transformers $T'1$ to $T'8$ by means of a reduced number of conductors and to carry a direct current making it possible to saturate one of the two transformers, of which the secondary windings $E'_s$ are connected in series, so as to define the particular column to which the transmitted signal belongs. This aspect of the operation of the reading circuit 38 corresponds to that described in detail relative to the supply circuit 36, so it will not be further described in detail here.

Thus, the column by column selection sequence is described in exemplified manner in the following table II. The control signal Icc could in particular be 20 mA.

TABLE II

| Column | Measuring Line | Phase of measuring signal Is compared with primary signal Ip | Injection line for saturation signal Ic.c. | Unused lines |
|---|---|---|---|---|
| x1 | X1 | 0° | X4 | X2,X3 |
| x2 | X1 | 0° | X2 | X3,X4 |
| x3 | X1 | 180° | X4 | X2,X3 |
| x4 | X1 | 180° | X2 | X3,X4 |
| x5 | X2 | 0° | X1 | X3,X4 |
| x6 | X2 | 0° | X3, | X1,X4 |
| x7 | X2 | 180° | X1 | X3,X4 |
| x8 | X2 | 180° | X3 | X1,X4 |
| x9 | X3 | 0° | X4 | X1,X2 |
| x10 | X3 | 0° | X1 | X2,X4 |
| x11 | X3 | 180° | X4 | X1,X2 |
| x12 | X3 | 180° | X1 | X2,X4 |
| x13 | X4 | 0° | X2 | X1,X3 |
| x14 | X4 | 0° | X3 | X1,X2 |
| x15 | X4 | 180° | X2 | X1,X3 |
| x16 | X4 | 180° | X3 | X1,X2 |

Reading of the table shows that the system is not optimized, because all the possibilities have not been used. In particular, the unipolar mode of the saturation current can be replaced by a bipolar mode making it possible to double the number of configurations. In particular, this makes it possible to double the number of columns without changing the number of conductors, by using 16 transformers groups into four rows of 4.

Supply circuit 36 and reading circuit 38 described hereinbefore function on low impedance circuits. This makes it possible to pass the signals over relatively great lengths without special precautions. In the application to the measurement of the displacement of a bar carrying an absorbing member and which has to be introduced into the core of a nuclear reactor, this tolerance with respect to distances makes it possible to position the processing circuit outside the reactor buildings.

Figure 6:
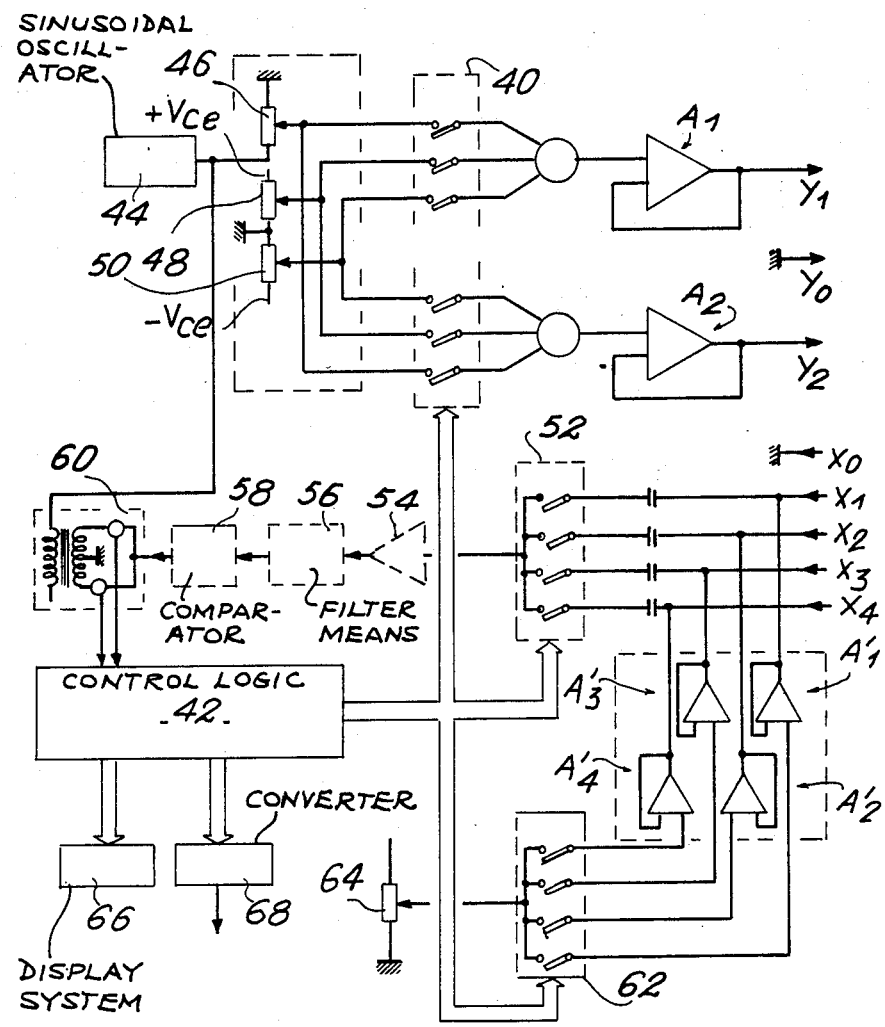
FIG. 6 shows a general block diagram of the control circuit for the complete measuring apparatus.

The flow chart of the processing circuit will now be described with reference to FIG. 6. This circuit only uses conventional components, so that only the functional aspect will be mentioned.

The circuit for the selection of lines Y1 and Y2 are controlled by two power amplifiers A1 and A2 connected as a current generator with the pass band passing, for example, from the continuous to 100 KHz. The nominal current value applied to these amplifiers is selected by a multiplexer 40, whose addressing is controlled by a control logic 42 with a mic roprocessor in accordance with the algorithm given hereinbefore in Table I. The reference quantities introduced into multiplexer 40 are either an alternating signal I from sinusoidal oscillator 44, or positive or negative direct current voltages Icc+Icc−. Potentiometers 46, 48 and 50 make it possible to regulate these three terms.

The reading circuits X1 to X4 are successively selected by a multiplexer 52 controlled by control logic 42. The thus chosen signal is amplified at 54, filtered at 56 and compared at 58 with a hysteresis-allocatd threshold. The output of the threshld is, after shaping, compared at 60 with reference signal I producing the line current. The logic signals from this phase comparison are then processed by the control logic 42.

On each of the connections X1 to X4, an amplifier A'1 to A'4 functioning as a current generator makes it possible to inject the continuous or direct component (e.g. 20 mA) used for saturating the reading transformers. A multiplexer 62 orients the nominal direct current 64 towards the amplifier in question. Multiplexers 52 and 62 are controlled by the control logic 42 in accordance with the algorithm given hereinbefore on Table II.

The control logic 42 also controls a display system 66 and a converter 68 having the function of supplying an analog signal representing the measured dimension.

The control logic 42 is managed by a microprocessor, which carries out the following tasks:

In the automatic mode

Processing the row and column selection sequences.
Checking the state of all the transducers.
Determination of the magnetic mark position (choice of the median position when two or three contiguous transducers are excited).
Processing the dimension in steps or mm.
Detection of abnormalities.

In the manual mode

Stepwise management of a test programme, with the display of the state of the selected detectors.

In the automatic mode, a complete scrutinization cycle can be carried out in less than 100 ms.

A model corresponding to the described variant has made it possible to prove the satisfactory operation of the apparatus according to the invention. An accuracy of ±1 step (16 mm) has been obtained in this way.

Obviously, the invention is not limited to this constructional variant and can be subject to numerous variations with regards to the nature of the transducers and the number thereof, the configuration of the interconnection matrix of said transducers, as well as that of the multiplexing circuits.

Thus, in a second constructional variant shown in FIGS. 7 to 10, the magnetometer transducers are replaced by flexible reed switches in a sealed envelope 110 (abbreviated to ILS).

Figure 7:
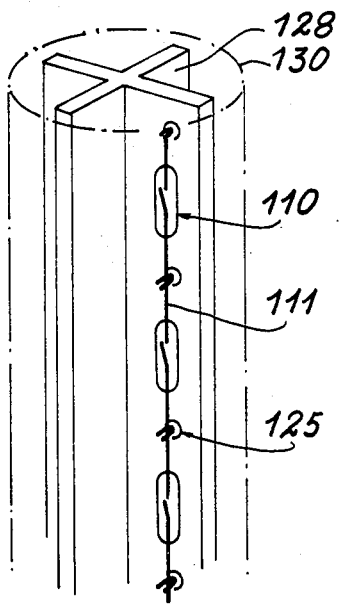
FIG. 7 is a perspective view of a second constructional variant of the invention using flexible reed switches as detectors.

The ILS 110 are arranged in a row and are electrically connected in series by connecting wires 110, as illustrated in FIG. 7. The ILS and the wires are mounted on a support 128, constituted by a cruciform shaped section, by means of electrically insulated connectors 125. As in the preceding variant, the assembly is placed in a tube 130, e.g. with a diameter of 21 mm. However, the magnetic members which shunted the air gap are not necessary, because this function is fulfilled by the ILS output wires, which are made from magnetic materials.

As in the preceding variant, several apparatuses, like that shown in FIG. 7, can be disposed around the guide tube, in which the absorbing rod moves when the invention is applied to the detection of the position thereof. Thus, a redundant measurement can be made.

Figure 8:
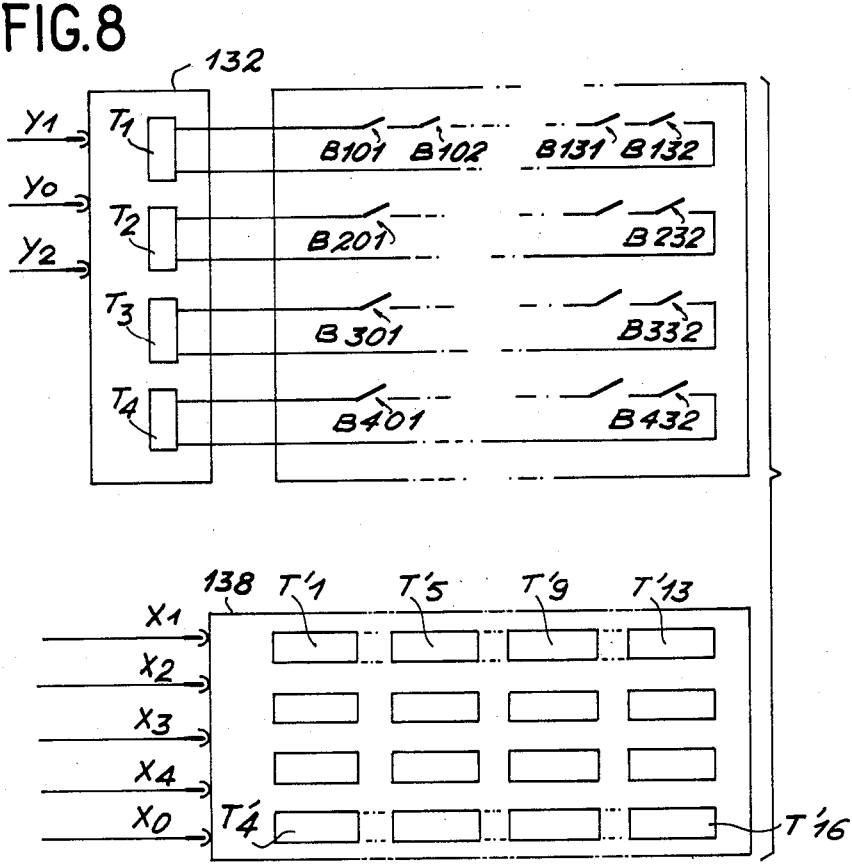
FIG. 8 is a diagram comparable to FIG. 3 showing the electrical interconnection circuit of the switches of FIG. 7.
Figure 9:
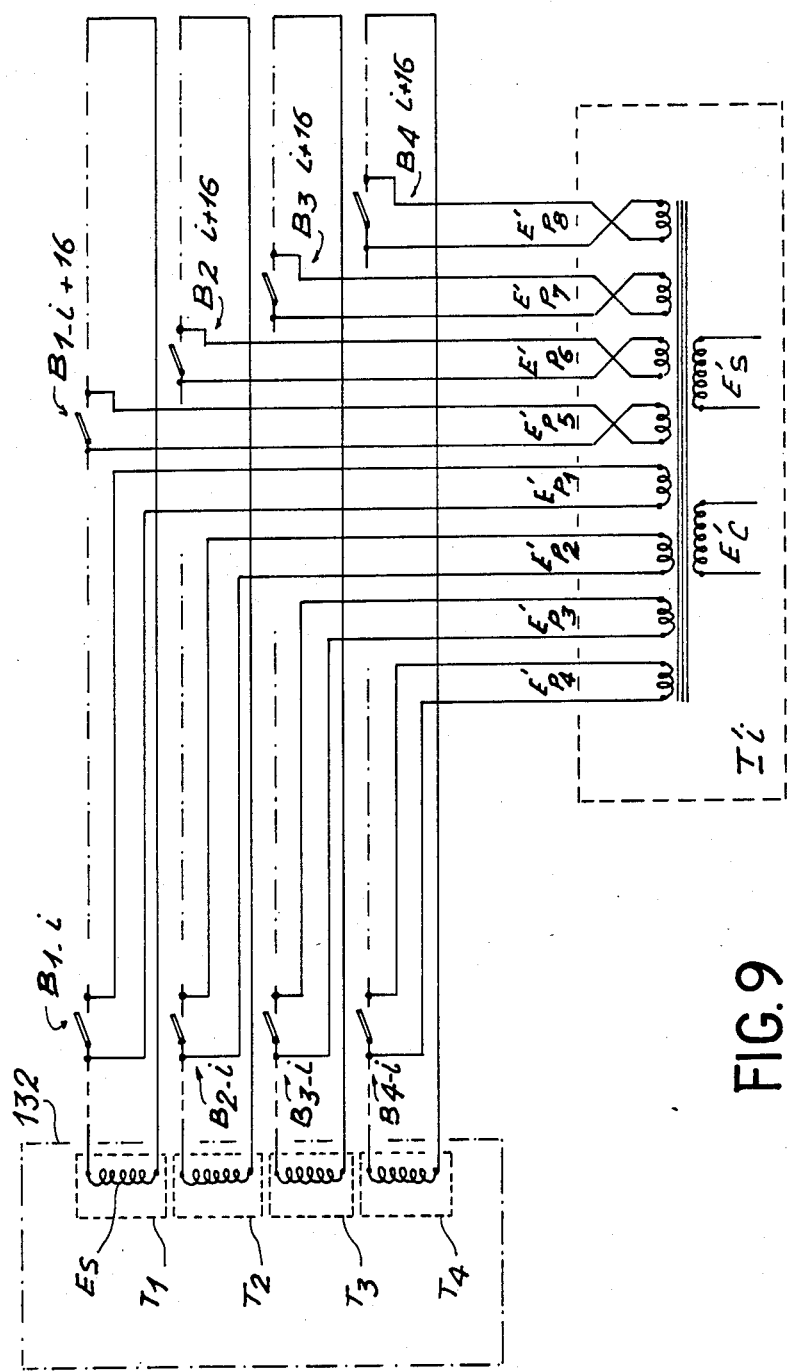
FIG. 9 shows, in greater detail, the connection of one of the transformers of the reading circuit to the reed switches.

The electrical interconnection of the ILS 110 is also realised in such a way that the latter are electrically grouped in the form of a matrix, as shown in FIG. 8. Thus, FIG. 8 shows in exemplified form, the base of an apparatus having 128 detectors 110, which are geometrically aligned and electrically grouped in order to form a matrix of four rows and 32 columns. In FIG. 8, the detectors are designated by the letter B with which is allocated a three digit number, the first digit giving the number of the row and the two others the number of the column. The mechanical installation of the ILS respects the increasing order of the numbers of the matrix, the origin being the top of the detector. The 32 detectors of each row are connected in series to the secondary winding $E_S$ of a corresponding transformer $T_1$ to $T_5$ for rows 1 to 4 (FIG. 9). Transformers $T_1$ to $T_4$ form part of the row multiplexing circuit 136, whose structure and operation are identical to those of circuit 36 described with reference to FIG. 4. There are also control means for circuit 136 and these are identical to those described in connection with FIG. 6.

As illustrated in FIG. 9, the electrical supply circuit for each of the rows of the matrix of transducers is closed by the primary windings $E'_{p1}$ to $E'_{p8}$ of transducers $T'_1$ to $T'_{16}$ of the column multiplexing circuit 138 with each of these primary windings being connected in parallel to one of the transducers 110. For simplification purposes, the connecting wires between the transducers and the transformers of circuit 138 have not been shown in FIG. 8.

More specifically, circuit 138 comprises a number of transformers $T'_1$ to $T'_{16}$ (16 in the described variant) equal to half the number of columns of the matrix of transducers. Moreover, each transformer comprises a number of primary windings $E'_{p1}$ to $E'_{p8}$ (8 in the described variant) equal to the number of rows of the matrix. Thus, the cumulative number of primary windings is equal to the number of transducers of the matrix.

As can be seen in FIG. 9 for a random $T'_1$ of the transformers $T'_1$ to $T'_{16}$, the primary windings $E'_{p1}$ to $E'_{p4}$ of transformer $T'_1$ are connected in parallel on switches $B_{1i}$ to $B_{4i}$, i.e. on the switches of column i, and the primary windings $E'_{p5}$ to $E'_{p8}$ of the same transformer $T'_i$ are connected in parallel of switches $B_{1i+16}$ to $B_{4-i+16}$ of column i+16. Moreover, windings $E'_{p1}$ and $E'_{p5}$, $E'_{p2}$ and $E'_{p6}$, $E'_{p3}$ and $E'_{p7}$ and $E'_{p4}$ and $E'_{p8}$ are respectively connected in phase opposition.

Bearing in mind the characteristics of the magnetic mark linked with the moving member, whose position it is wished to measure, i.e. an absorbing rod of a nuclear reactor in the present case, the different parts of the apparatus are obviously dimensioned in such a way that at least one ILS is always closed, no matter what the position of the moving member. Moreover, the number of the columns of the matrix is chosen in such a way that it is at least equal to double the maximum number of consecutive ILS which can be simultaneously closed (the number of ILS is 15 in the present variant).

Bearing in mind these hypotheses, the operation of the system described hereinbefore with reference to FIGS. 8 and 9 is as follows, on taking for example transducers $B_{1-i}$ and $B_{1-i+16}$ of the first row of transducers and the associated transformer $T'_i$. When the first row is selected by circuit 132, the excitation current passes through the primary windings $E'_{p1}$ and $E'_{p5}$ of transformer $T'_1$, which are in phase opposition.

If switches $B_{1-i}$ and $B_{1-i+16}$ are open, the resulting flux in $T'_i$ is zero and the current in the secondary winding $E'_S$ of the transformer is consequently zero.

If $B_{1-i}$ is closed and $B_{1-i+16}$ open, the current in $E'_{p1}$ is substantially zero, whereas it is nominal in winding $E'_{p5}$. The sum of the ampere-turns is consequently no longer zero and a current is produced in $E'_S$, which is in phase opposition with the current supplying the first row of transducers.

Conversely, if $B_{1-i}$ is open and $B_{1-i+16}$ closed, the reasoning then is the same, but the current produced in $E'_S$ is in phase with the current supplying the first row.

When the following row is selected, e.g. row 22, it is windings $E'_{p2}$ and $E'_{p6}$ which come into action in accordance with the same procedure, and so on through the other rows.

This leads to a signal of the same type as that obtained in the variant described hereinbefore with reference to FIGS. 3 to 6.

Figure 10:
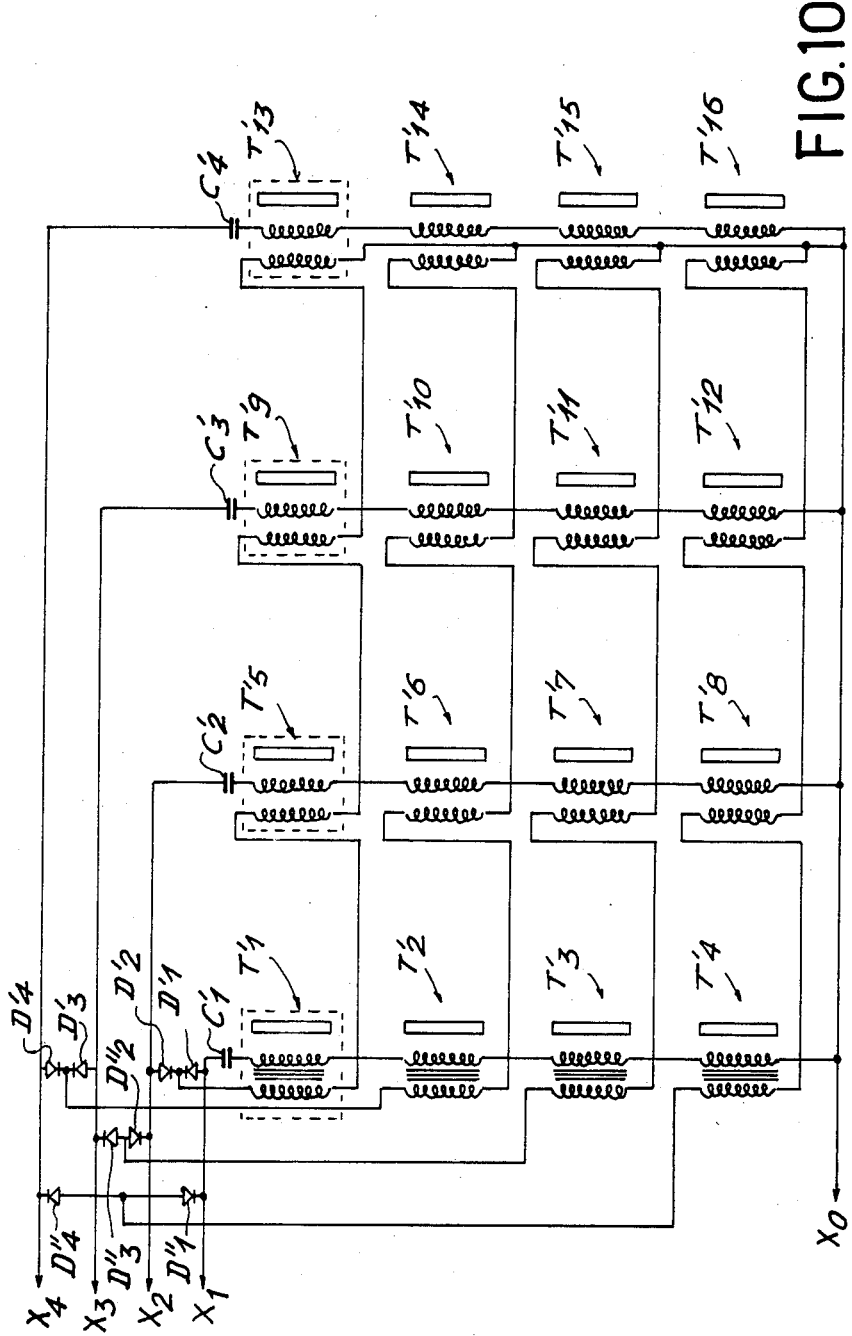
FIG. 10 shows, in greater detail, the reading circuit of the transducers in the variant of FIGS. 7 to 9.

As in the first variant and as illustrated in FIGS. 9 and 10, each of the transformers $T'_1$ and $T'_{16}$ comprises, apart from the aforementioned primary windings $E'_{p1}$ and $E'_{p8}$ and the secondary winding $E'_S$, a control winding $E'_c$ making it possible to inject a direct current which, by saturation of the magnetic core, makes it possible to cancel out at random the signal which may be present on $E'_S$.

FIG. 10 shows that the windings $E'_c$ and $E'_S$ of transformers $T'_1$ to $T'_{16}$ are grouped from the electrical standpoint in the form of a matrix of four rows and four columns. In this matrix windings $E'_S$ are connected in series along the four columns and the windings $E'_C$ are connected in series along the four rows.

As in the variant described hereinbefore with reference to FIG. 5, four supply and reading lines X1 to X4 and a common line X0 connect the transformers to a control circuit, identical to the circuit described with reference to FIG. 6. Thus, the windings $E'_S$ of each column of the matrix of transformers $T'_1$ to $T'_{16}$ are connected to one of the lines X1 to X4 by means of a capacitor $C'_1$ to $C'_4$, the circuit being closed on line $X'$. In the same way, windings $E'c$ of each row of the matrix are connected to two of the rows respectively X1X2, X3X4, X2X3 and X1X4 across diodes $D'D1D'2$, $D'3D'4$, $D''2D''3$ and $D''1D''4$. passing to the output line X0.

As a result of this arrangement, on each of the lines X1 to X4 are grouped the signals relating to 8 columns of the ILS matrix. The selection of two of these 8 columns, i.e. of only one of the transformers, is obtained by injecting a continuous or direct component saturating the transformers, whose signal is undesirable. The selection algorithm is identical to that indicated hereinbefore with reference to the first constructional variant.

In practice, each of the primary windings of transformers T'1 to T'16 only has a single turn advantageously obtained by means of U-links, which are fixed to the printed circuit with the windings $E'C$ and $E's$ being wound onto the core.

It is apparent from the description of the two aforementioned embodiments, that the principal of the invention is mainly based on the multiplexing system, which makes it possible to separately analyze the state of each of the transducers and consequently eliminate the ambiguities which may result from the presence of several magnetic marks on several parts of the moving member, and particularly at the top and bottom thereof. Moreover, this multiplexing system makes it possible to carry out the measurement by means of a substantially unlimited number of transducers, which is not the case more particularly with an apparatus operating in a binary code by means of type R-2R resistance networks, in which the coding on more than 7 or 8 bits is not possible in practice.

As a result of this analysis, it is apparent that the invention is not limited to the embodiments described, but in a general manner covers row and column multiplexing circuits respectively grouping n transformers and p/2 transformers, n.p transducers being electrically grouped in a matrix of n rows and p columns. Each transformer preferably comprises a secondary winding and a control winding, the latter being used for saturating the transformers, whose signal is undesirable. Finally, the transformers of the column multiplexing circuit are grouped into a matrix of k rows and l columns from the standpoint of the electrical connections of the secondary and control windings. In the same way, the transformers of the two multiplexing circuits are grouped into a matrix of a rows and b columns from the standpoint of the electrical connections of the primary and control windings.

What is claimed is:

1. An apparatus for measuring the position of a moving member in a given direction relative to a fixed member, comprising:
    a magnetic flux generating mark carried by the moving member; and
    at least one alignment of transducers changing state under the effect of said magnetic flux, the transducers being positioned at regular intervals on the fixed member in said given direction, in such a way that at least one transducer changes state under the effect of the magnetic flux, wherein the transducers of the same alignment are electrically grouped according to a matrix of n rows and p columns, whose n rows are supplied in turn by supply means and whose p columns are processed in turn by reading means, wherein the supply means comprise n transformers, each having a primary winding connected to an alternating current supply source via first multiplexing means and a secondary winding each of said secondary windings being connected in series with the transducers of the same matrix row.

2. An apparatus according to claim 1 wherein each of the n transformers also comprises a control winding, the n transformers being electrically grouped according to a matrix of a rows and b columns, the primary windings of each of said a rows being connected in series with each other and connected to said alternating current supply source via said first multiplexing means, and the control windings of each of said b columns being connected in series with each other and connected to a direct current source via said first multiplexing means.

3. An apparatus according to claim 2 wherein the supply means also comprise a supply lines connected to said first multiplexing means, the primary windings of each of said a rows being connected to one of said supply lines across a capacitor, and the control windings of each of said b columns being connected to one of said supply lines across a diode.

4. An apparatus according to claim 1, wherein the transducers are magnetometer transducers having a magnetic core with a rectangular hysteresis loop and two windings wound onto said core and respectively constituting excitation and reading elements, the excitation elements of the transducers of each of said n rows being connected in series with each other, and the reading elements of the transducers of each of said p columns being connected in parallel with each other.

5. An apparatus according to claim 4, wherein the magnetometer transducers are fixed to a non-magnetic support and are separated by magnetic shunts, the transducers, the support and the shunts being placed in a non-magnetic tube arranged at the other side of the fixed member with respect to the moving member.

6. An apparatus according to claim 1 wherein several alignments of transducers are placed on the fixed member around the moving member, the transducers of each alignment being located at the same level, so as to give a redundant measurement of the position of the moving member.

7. An apparatus according to claim 1 wherein the moving member moves in accordance with a given incremental step and wherein the distance between two consecutive transducers of the same alignment is equal to twice the said step.

8. An apparatus according to claim 1, wherein the reading means comprise p/2 transformers, each having at least two primary windings in phase opposition and respectfully connected to two non-consecutive transducers of one of said rows, and a secondary winding which is connected to a measuring circuit via second multiplexing means.

9. An apparatus for measuring the position of a moving member in a given direction relative to a fixed member, comprising:
a magnetic flux generating mark carried by the moving member; and
at least one alignment of transducers changing state under the effect of said magnetic flux, the transducers being positioned at regular intervals on the fixed member in said given direction, in such a way that at least one transducer changes state under the effect of the magnetic flux, wherein the transducers of the same alignment are electrically grouped according to a matrix of n rows and p columns wherein n and p are at least equal to two, whose n rows are supplied in turn by supplying means and whose p columns are processed in turn by reading means, wherein the reading means comprise p/2 transformers, each having at least two primary windings in phase opposition and respectively connected to two non-consecutive transducers of one of said rows, and a secondary winding which is connected to a measuring circuit via second multiplexing means.

10. An apparatus according to anyone of claims, 9 or 8 wherein the transducers are reed switches, the switches of each of said n rows being connected in series, each of the p/2 transformers having 2n primary windings, each switch of two non-consecutive of said p columns being connected in parallel on a different primary winding of one of the p/2 transformers, in such a way that the primary windings connected to two switches of the same of said n rows are in phase opposition.

11. An apparatus according to claim 10, wherein the reed switches are electrically connected by conductors made from a magnetic material and are fixed to a support by means of electrically insulating connectors, the switches, the conductors, the supports and the connectors being placed in a non-magnetic tube arranged at the other side of the fixed member with respect to the moving member.

12. An apparatus according to any one of claims 9 or 8 wherein each of the p/2 transformers also comprises a control winding, the p/2 transformers being electrically grouped according to a matrix of k rows and l columns, the secondary windings of each of said k rows being connected in series with each other and connected to said measuring circuit, and the control windings of each of said l columns being connected in series with each other and connected to a direct saturating current source via a third multiplexing means.

13. An apparatus according to any one of claims 9 or 8 wherein the reading means comprise k measuring lines connected to said second multiplexing means, the secondary windings of each of said k rows being connected to one of said measuring lines across a capacitor, and the control windings of each of said l columns being connected to one of said measuring lines across a diode.

* * * * *